United States Patent [19]

Shimoyama

[11] Patent Number: 5,629,576
[45] Date of Patent: May 13, 1997

[54] COMMUTATOR

[75] Inventor: Syuji Shimoyama, Kasakakemachi, Japan

[73] Assignee: Mitsuba Electric Manufacturing Co., Ltd., Gunma, Japan

[21] Appl. No.: 421,677

[22] Filed: Apr. 12, 1995

[30] Foreign Application Priority Data

Apr. 25, 1994 [JP] Japan .................................. 6-109002

[51] Int. Cl.$^6$ ............................................... H02K 13/06
[52] U.S. Cl. .............................. 310/237; 310/235; 310/71
[58] Field of Search ................................. 310/237, 236, 310/235, 42, 43, 234, 71; 29/597

[56] References Cited

U.S. PATENT DOCUMENTS

| | | | |
|---|---|---|---|
| 4,349,384 | 9/1982 | Weinert | 75/208 R |
| 4,399,383 | 8/1983 | Kamiyama | 310/233 |
| 4,837,473 | 6/1989 | Matuda et al. | 310/237 |
| 4,851,728 | 7/1989 | Doege et al. | 310/233 |
| 4,888,511 | 12/1989 | Aoki | 310/237 |
| 5,144,183 | 9/1992 | Farrenkopf | 310/268 |
| 5,175,463 | 12/1992 | Farago et al. | 310/237 |
| 5,400,496 | 3/1995 | Kemmner et al. | 29/597 |
| 5,422,528 | 6/1995 | Prahl | 310/235 |

Primary Examiner—Thomas M. Dougherty
Assistant Examiner—Michael J. Wallace, Jr.
Attorney, Agent, or Firm—McCormick, Paulding & Huber

[57] ABSTRACT

A flat disk type commutator 1 according to the embodiment comprises: a boss 16 which is formed into a thick approximately disk-shape; a plurality of segments 21, each of which is formed into an approximate sector, which are radially arranged on the surface of the boss 16 with an approximately equally space; a riser bar 4 which is electrically connected to each segment 21, as a conductive base material; slits 20 providing a state in which adjacent segments 21 are insulated from each other. A recess 11 is formed at each segment 21. A projecting portion 6 is formed at the riser bar 4. The projecting portion 6 is inserted to the recess 11 in a state in which a copper powder layer 12 and a solder layer 14 is formed at the recess 11, and is soldered. Each riser bar 4 is in a state to electrically connect with the segment 21 by the copper powder layer 12 and the solder layer 14.

4 Claims, 2 Drawing Sheets

COMMUTATOR

BACKGROUND OF THE INVENTION

1. Field of the Invention

This invention relates to a commutator, and more particularly to a flat disk commutator in which a segment is arranged on one end face in axial direction of a boss and in a circumferential direction of the boss, which is effectively employed, for instance, in an "In-Tank Type Fuel Feed Pump" in which a motor is integrated with a pump.

2. Related Art Statement

In general, as a fuel feed pump for feeding a fuel to a vehicle such as an automobile, an "In-Tank Type Fuel Feed Pump" in which a motor is integrated with a pump, which is provided in a fuel tank, has been proposed. In an "In-Tank Type Fuel Feed Pump", a "Flat Disk Type Commutator" is employed as a motor.

One the other hand, an "In-Tank Type Fuel Feed Pump" is generally constructed so that a fuel can be fed from a pump to the outside through a motor housing. In this case, the fuel touches to the commutator of the motor.

By the way, in the case of use of gasohol in which alcohol is mixed with the gasoline as fuel, when copper of the commutator which is used in the motor of the fuel feed pump contacts with the gasohol, the fuel is altered, or the copper is penetrated. Hence, a commutator for gasohol is proposed in, for example, U.S. Pat. No. 5,175,463. In this patent, a protecting portion chip(s) made from carbon is(are) attached, by soldering, to at least one surface contacting a brush in a copper of a base member of a segment (commutator bar). In this commutator, carbon has almost no solderability, so that a nickeling and a coppering for a soldered face of the protecting portion chip made from carbon is proposed.

However, in the commutator in accordance with the prior art, a plating step is necessary, so that the manufacturing steps and the manufacturing costs increase.

Further, the protecting portion chip made from carbon by soldering is electrically and mechanically connected to a base material of the segment, so that there is a possibility that the soldering layer could melt and escape from a connecting surface between the carbon protecting portion chip and the base material of the segment when an armature coil is fused to the riser portion protrudely integrated with the base material. High fusing point solder is therefore used to avoid this state, operating time for the soldering become long, so that the productivity even more decreases.

SUMMARY OF THE INVENTION

It is an object of the present invention to provide a commutator in which carbon and conductive material can be connected with each other even in case of the omission of a plating step for carbon.

A commutator according to the present invention comprises a boss made from resin, which is unitarily formed into a disk-shape; a plurality of carbon segments arranged on an end surface of the axial direction of the boss with an equal spacing in the circumferential direction of the boss, which are insulated from each other and are fixed; and a plurality of the conductive base materials, which are electrically connected to each of the carbon segments respectively; wherein: a recess is formed at each of the carbon segments; a conductive member having conductivity and solderability is fixedly provided in the recess; and each conductive base material is touched to each of the carbon segments so as to blockade the recess by a part thereof and the blockaded portion is soldered to the conductive member.

Further, a commutator according to the present invention comprises a boss made from resin, which is unitarily formed into a disk-shape; a plurality of carbon segments arranged on an end surface of the axial direction of the boss with an equal spacing in the circumferential direction of the boss, which are insulated from each other and are fixed; and a plurality of the conductive base materials, which are electrically connected to each of the carbon segments respectively; wherein: a recess is formed at each of the carbon segments; a conductive binding member is filled in each of the recesses; and each conductive base material is touched to each segment so as to blockade the recess by a part thereof and the blockaded portion is bound thereby.

Furthermore, slits are provided between adjacent segments for insulating in a commutator.

According to the first commutator described hereinbefore, by a soldering of a part of the conductive base material to the conductive member filling the recess of the carbon segment, and according to the second commutator, by the conductive adhesive material; the carbon segment and the conductive base material are electrically connected with each other. Therefore, it is possible to omit the plating step for the carbon segment for connecting the conductive base material with the carbon segment.

Further, in the first commutator, the recess of the segment is blocked by a part of the conductive base material, so that the melting solder does not escape from the recess even in the state in which the solder layer is melted after a soldering between the conductive member and the conductive base material. Thus it is possible to avoid using a high fusing solder as solder.

Hence, according to the present invention, it is possible to provide a commutator in which carbon and conductive material can be connected with each other even in case of an omission of a plating step for carbon, and to realize the manufacturing easily.

DETAILED DESCRIPTION OF THE INVENTION

Figure 1A:
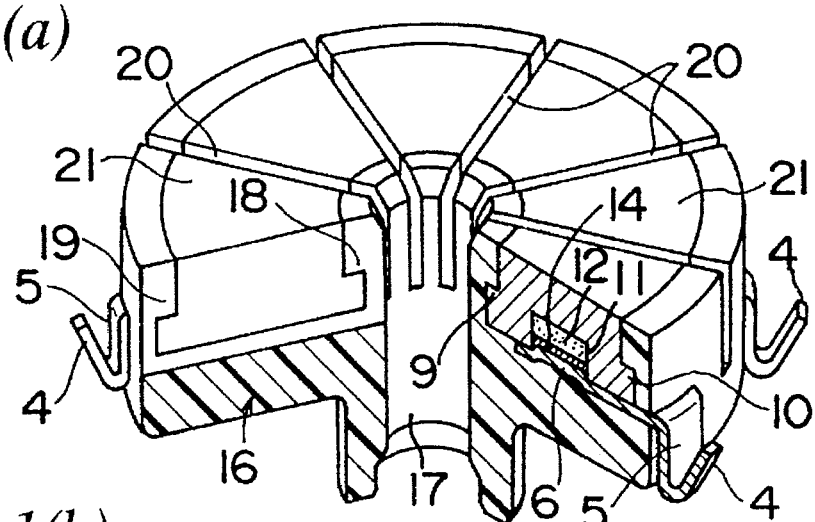
FIG. 1(a) is a fragmentary sectional perspective view showing a commutator in accordance with the first embodiment of the present invention.
Figure 1B:
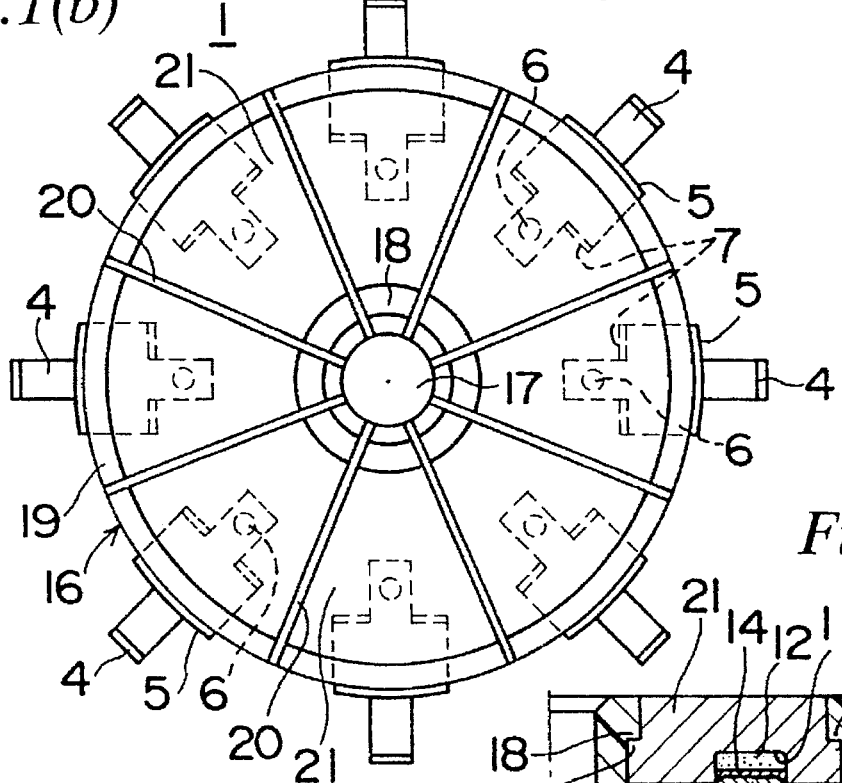
FIG. 1(b) is a plan view showing a commutator in accordance with the first embodiment of the present invention.
Figure 1C:
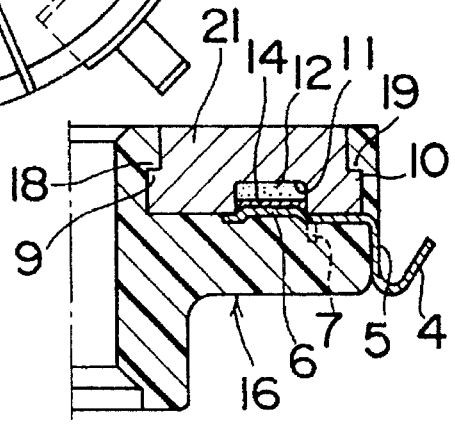
FIG. 1(c) is a fragmentary sectional front view showing a commutator in accordance with the first embodiment of the present invention.

In this embodiment, a commutator according to the present invention is constructed as a "flat disk type" and to be employed in a motor in an "in tank type fuel feed pump".

A flat disk type commutator 1 according to the embodiment comprises: a boss 16 which is formed into an approximately thick disk-shape; a plurality of segments 21, each of which is formed into an approximately sector, which are radially arranged on the surface of the boss 16 with an approximately equal spacing; a riser bar 4 which is electrically connected to each segment 21, as a conductive base material; and a slit 20 for insulating adjacent segments 21 from each other. A shaft hole 17 is opened at the boss 16 for fixing a motor shaft by passing it therethrough.

Each segment 21 is formed by baking a work made from carbon powder with an appropriate binder, a recess 11 is respectively provided in a sinking manner on each segment 21 facing the boss 16. The riser bar 4 consisting of copper or alloyed copper is unitarily connected in a state in which the riser bar 4 gets between the segment 21 and the boss 16. A projecting portion (connected portion) 6 is projectingly formed at the inside end portion of the riser bar 4 by a press-plastic working, the projecting portion 6 is positioned by being inserted in the recess 11 of the segment 21, an opening portion of the recess 11 is blockaded by the inside end portion. A copper powder layer 12 as a conductive member is formed in the recess 11 of the copper powder layer 12, by a caulking of copper powder. An inside end portion including the projecting portion 6 of the riser bar 4 is electrically connected to the copper powder layer 12, by a soldering. Thus, the riser bar 4 is in a state to be electrically connected to the segment 21 through the solder layer 14 and the copper powder layer 12.

Further, at both sides of the projecting portion 6 on the inside end of an enlarging portion 5 continuously provided to the riser bar 4, a pair of engaging claws 7 constructing an anchor for fixing the riser bar 4 to the boss 16, is formed so as to project to the opposite end side of a projecting side of the projecting portion 6, and is buried in the boss 16.

On an inside circumferential surface and an outside circumferential surface of an end surface of the segment 21, an inside step 9 and an outside step 10 are formed with a constant width and height. The inside step 9 and the outside step 10, after the boss 16 is formed by resin, is in a state to be engaged to a part of the boss 16, and is constructed so that the boss 16 and each carbon segment can be unitarily connected to each other by connecting in the axial direction and the diameter direction thereof.

In the flat disk type commutator 1 constructed as above, after the shaft hole 17 is fixed in a fitting manner to the motor shaft, an armature coil (not shown) is contacted (e.g. hitched, entwined) to each riser bar 4, which is electrically contacted thereto by a fusing. When fusing, the riser bar 4 is heated. Then, the solder layer 14 is formed in the recess 11, moreover, it is blockaded by the projecting portion 6 of a part of the riser bar 4, so that solder material does not escape from the inside of the recess 11 even in a state in which the solder layer 14 being a liquid state due to fusing. Hence, it is unnecessary to use a high fusing solder as the solder layer 14.

Hereinafter are the advantages which are attained through the above embodiment.

(1) Since a plating step for the carbon plate is omitted, it is possible to decrease the number of manufacturing steps and the cost.

(2) Since it is unnecessary to use a high fusing solder as the solder layer 14, it is possible to shorten the operating time for the soldering. Further, since the solder layer 14 is formed in the recess 11, it is possible to avoid that the total length of the commutator will be long.

Figure 2A:
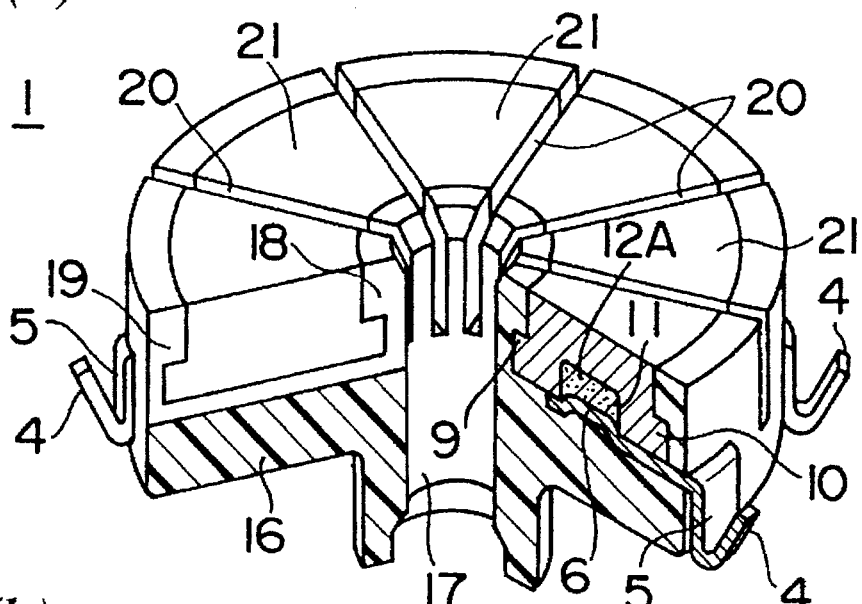
FIG. 2(a) is a fragmentary sectional perspective view showing a commutator in accordance with the second embodiment of the present invention.
Figure 2B:
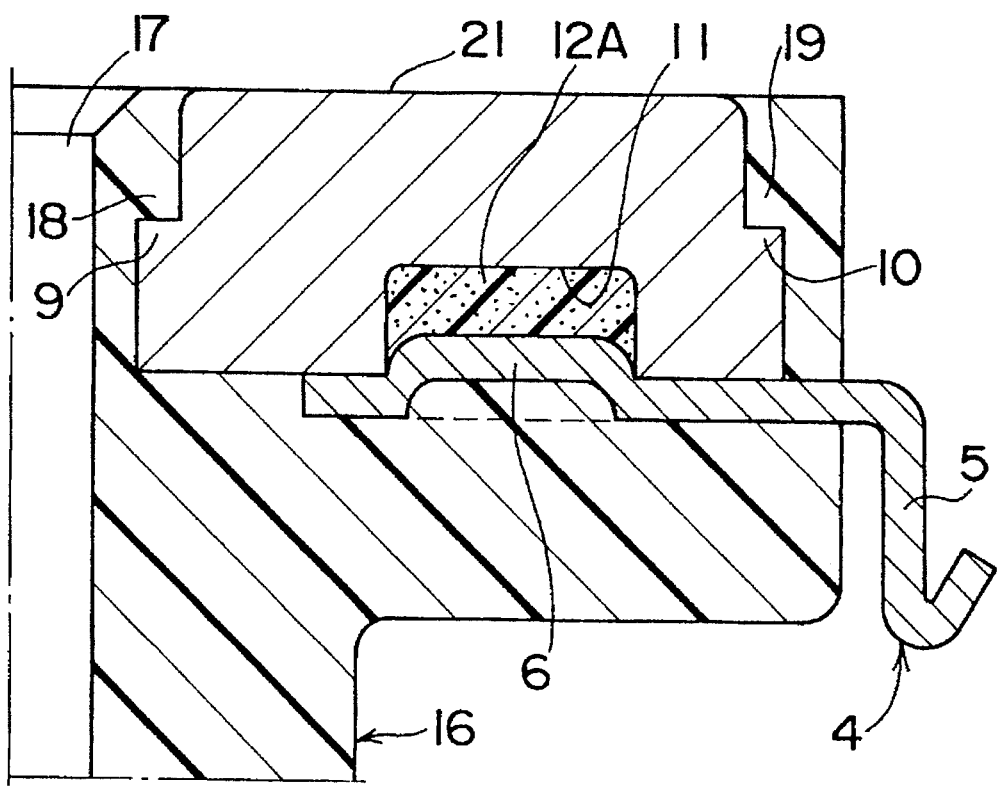
FIG. 2(b) is an enlarged fragmentary sectional front view showing a commutator in accordance with the second embodiment of the present invention.

FIG. 2(a) and FIG. 2(b) show a commutator in accordance with the second embodiment, FIG. 2(a) is a fragmentary sectional perspective view, FIG. 2(b) is an enlarged fragmentary sectional front view.

A point in which the second embodiment differs from the first embodiment, is that the projecting portion 6 of a part of the riser bar 4 is bound on a conductive binding member 12A filled in the recess 11 of the segment 21. The conductive binding member 12A is constructed from material in which powder and/or granular material, short fiber-like material and the like consisting of conductive material are mixed in the binder, which has an adhesive property for each surface of carbon and copper, and is constructed so as to be able to electrically connect carbon and copper with each other in a binding state thereto.

In the second embodiment, since each riser bar 4, and each segment 21 are electrically connected with each other by the conductive binding member 12A, it is unnecessary to plate the carbon plate 8. Further, since the conductive binding member 12A is not melted by a fusing for the riser bar 4, it is also possible to obtain the same advantages as the first embodiment in the second embodiment.

The present invention is not limited to these embodiments; in so far as the essence of the invention is not deviated from, it goes without saying that the present invention can be modified, prevention of the escape of the solder layer 14 is not limited by the behave of the projecting portion 6 of the riser bar 4, for example, it is possible to behave in accordance with a part of the riser bar 4.

What is claimed is:

1. A commutator, comprising:
    a boss made from resin, which is unitarily formed into a disk-shape and has an end surface in the axial direction of the boss;
    a plurality of carbon segments arranged on said end surface of the boss with an equal spacing in the circumferential direction of the boss, which are insulated from each other and are fixed to the boss; and
    a plurality of conductive base materials, each of which conductive base materials is associated with a respective one of the carbon segments; wherein:
    a recess is formed in each of the carbon segments;
    a conductive member having conductivity and solderability is fixedly provided in the recess;
    a solder material is provided in the recess;
    each conductive base material is touched to the associated one of said carbon segments so as to block the recess of the segment by a blockading part of said conductive base material; and
    each of the conductive base materials is electrically connected to the associated carbon segment by said blockading part being soldered to the conductive member by said solder material.

2. A commutator, comprising:
    a boss made from resin, which is unitarily formed into a disk-shape and has an end surface in the axial direction of the boss;
    a plurality of carbon segments arranged on said end surface of the boss with an equal spacing in the circumferential direction of the boss, which segments are insulated from each other and are fixed to the boss; and
    a plurality of conductive base materials, each of which conductive base materials is associated with a respective one of the carbon segments; wherein:
    a recess is formed in each of the carbon segments;
    a conductive ,binding member is filled in each of the recesses;

each conductive base material is touched to the associated segment so as to block the recess by a blockading part of said conductive base material; and each conductive base material is electrically connected to the associated carbon segment by binding of said blockading part of said conductive base material and of said segment with said conductive binding member.

3. The commutator according to claim 1, wherein slits are provided between adjacent segments for insulating.

4. The commutator according to claim 2, wherein slits are provided between adjacent segments for insulating.

* * * * *

UNITED STATES PATENT AND TRADEMARK OFFICE
CERTIFICATE OF CORRECTION

PATENT NO. : 5,629,576
DATED : May 13, 1997
INVENTOR(S) : SHIMOYAMA

It is certified that error appears in the above-indentified patent and that said Letters Patent is hereby corrected as shown below:

Title page, item
[75] Inventor: Syuji Shimoyama, Gunma, Japan

Signed and Sealed this

Twenty-third Day of September, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,629,576
DATED : May 13, 1997
INVENTOR(S) : Shimoyama

It is certified that error appears in the above-indentified patent and that said Letters Patent is hereby corrected as shown below:

On the title page, item [73]

Assignee: Mitsuba Corporation, Gunma, Japan

Signed and Sealed this

Thirteenth Day of January, 1998

Attest:

BRUCE LEHMAN

Attesting Officer     Commissioner of Patents and Trademarks